Nov. 25, 1924.

S. J. SIBLEY ET AL

VALVE

Filed June 23, 1923

1,517,024

Inventors
Samuel J. Sibley
and Levi G. Buckner

Attorney

Patented Nov. 25, 1924.

1,517,024

UNITED STATES PATENT OFFICE.

SAMUEL J. SIBLEY AND LEVI G. BUCKNER, OF MEMPHIS, TENNESSEE.

VALVE.

Application filed June 23, 1923. Serial No. 647,402.

*To all whom it may concern:*

Be it known that we, SAMUEL J. SIBLEY and LEVI G. BUCKNER, citizens of the United States of America, residing at Memphis, in the county of Shelby and State of Tennessee, have invented certain new and useful Improvements in Valves; and we do hereby declare that the following is a full, clear, concise, and exact description of the invention, such as will enable others skilled in the art to which it appertains to make and use the same.

This invention relates to improvements in control devices for motor driven vehicles, having for an object to provide a control device so operable whereby when the supply of gaseous fuel from the charge forming device of the vehicle motor is discontinued or interrupted by releasing the accelerator actuating lever, the clutch connecting the motor to the driving shaft of the vehicle will be disconnected or moved to its neutral position, hence interrupting the transmission of power to the driven wheels of the vehicle and avoiding the necessity of manually operating the clutch actuating lever as when temporarily stopping or retarding the motion of a motor driven vehicle or when shifting the gear of the variable speed transmission mechanism thereof.

It is likewise an object of the invention to provide a device of the character mentioned, which when attached to the accelerator and clutch operating lever will in no way interfere with ordinary or usual usage of the same, should the occasion therefor arise.

Other objects will be in part obvious and in part pointed out hereinafter.

In order that the invention and its mode of operation may be readily understood by persons skilled in the art, we have in the accompanying illustrative drawings, and in the detailed following description based thereon, set out one possible embodiment of the same.

Figure 1:
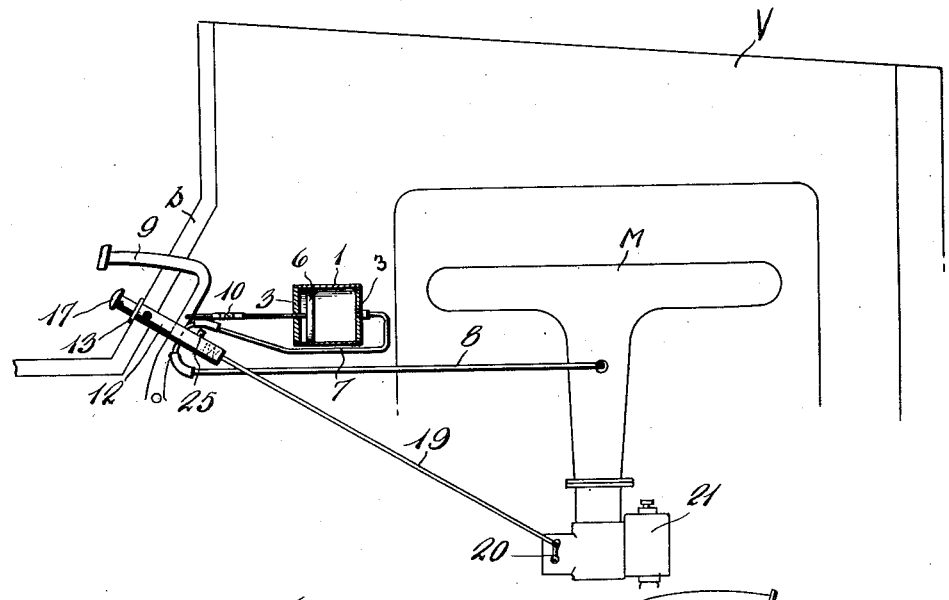
Figure 2:
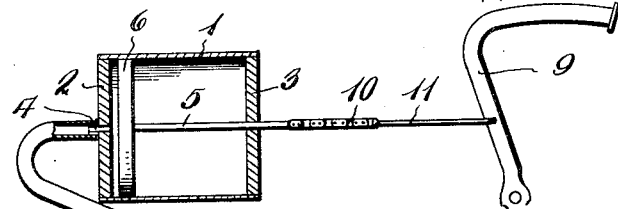
Figure 2:
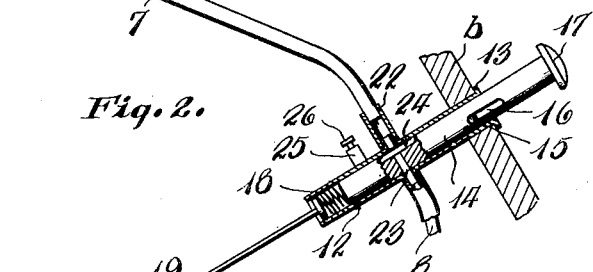

In these drawings:

Figure 1 is a side elevation of the improved device applied to the accelerator actuating device and clutch actuating lever of a motor driven vehicle, the cylinder of the suction operated mechanism being shown in section; and, Figure 2 is an enlarged sectional view through the device showing the arrangement of the piston within the cylinder of the suction operated mechanism and the construction of the valve means in the accelerator actuating device.

Having more particular reference to the drawings, in connection with which like characters of reference will designate corresponding parts throughout, the invention may be stated to comprise a cylinder 1 having end walls 2 and 3 arranged therein, the end wall 2 having a port 4 in the same, while the wall 3 is provided with an opening for slidably receiving the piston rod of a piston 6 snugly arranged within and slidable longitudinally of the cylinder 1. A flexible copper tubing or the like 7 is connected at one end to the nipple portion of the port 4 of the cylinder 1, while the opposite end thereof is disposed for engagement with the valve or control means of the invention, hereinafter more fully described; a second tubing 8 being also extended from said means into engagement with the intake manifold M of the motor of the equipped motor driven vehicle V as indicated in the Figure 1. Thus, it will be understood that with establishing of communication between the intake manifold M and the outer end of the cylinder 1, suction in the outer portion of said cylinder will be created and will cause retraction of the piston 6 therein in a direction towards the end wall 2.

In order that connection may be effected between the piston rod 5 and the clutch actuating foot lever 9 of the vehicle, we connect one end of a chain 10 to the outer end of said piston 5, while the opposite end thereof is connected to a link 11 having pivotal connection with the foot lever 9 as indicated in the Figure 2. Thus, it will be understood that with retraction of the piston 6 in the cylinder 1, a pull will be imparted to the foot lever 9, hence moving the same to that position whereat the clutch controlled thereby will be arranged in its neutral or disconnected position. Should it be desired to manually operate the clutch actuating lever 9 independently of the piston 6, this, of course, may be readily effected by reason of the interpositioning of the flexible connection or chain 10 between the piston rod 5 and the connecting link 11. Such movement of the lever 9 will not be transmitted to the piston 6 and hence, will not vary or disturb its positioning within the cylinder 1.

Fixedly mounted and extended through a portion of the flooring or foot board of the vehicle V, indicated herein by the reference character *b*, is a cylindrical sleeve 12, having the upper end thereof flanged and engaged with the upper face of the floor board *b*, as indicated at 13, while a plunger or accelerator actuated device 14 is snugly and slidably received therein, such sliding movement being limited by means of a cross pin 15 secured at its opposite ends to the opposite side walls of said sleeve 12 and passing through a slot 16 formed in the intermediate portion of the device 14. The usual head 17 is arranged upon the upper or outer end of the device 14 and serves for an obvious purpose. To the inner or lower end of the device 14, there is attached one end of a coiled spring 18 having the upper end of a connecting link 19 connected to its opposite extremities, such link 19 extending into engagement with the arm 20 fixedly connected to the fuel supplying valve of the charge forming device 21 of the vehicle V. Thus, it will be understood that the usual accelerator arrangement is provided for whereby when the device 14 is depressed, the fuel supply valve of the charge forming device 21 will correspondingly open to permit of increased passage of fuel through the intake manifold M into the engine cylinders. However, when the device 14 is released, it will return to its uppermost position and will accordingly discontinue the supply of gas from the charge forming device 21 to the intake manifold M.

Oppositely disposed ports having nipples or sleeves 22 extending therefrom are formed in the intermediate portion of the sleeve or casing 12 and receive the adjacent ends of the tubing 7 and 8 therein.

A port or way 23 extends diametrically through the intermediate portion of the device 14 and has one end thereof enlarged as indicated at 24. Thus, it will be understood that when the port 23 aligns with the oppositely disposed port in the casing 12, communication will be established between the intake manifold M of the vehicle motor and the cylinder 1 of the device. Hence, suction will be created in one end of said cylinder 1 for causing movement of the piston 6 in a direction towards the end wall 2 thereof. However, when the port 23 is disaligned with the ports of the casing 12, such communication will be interrupted and in consequence, the piston 6 will be permitted to return to the position adjacent the end wall 3 of the cylinder 1.

An escapement valve 25 is arranged upon and communicates with the interior of the casing 12, being provided with an adjustable valve proper 26 whereby when the accelerator actuating device 14 is disaligned with the ports in the opposite sides of the casing 12, the enlarged portion 24 of the port 23 will establish communication between the cylinder 1 and the atmosphere through the escape valve 25, thus permitting the admission of air to the cylinder 1 and the resultant return of the piston 6 to its normal position within said cylinder, that is, in proximity to or adjacent the end wall 3. The adjustment of the valve 26, obviously, regulates the admission of air to the cylinder 1 under these conditions.

The operation of the improved device may be reviewed as follows:

The piston 6 is normally in a position adjacent the end wall 3 of the cylinder 1, that is, when communication between the cylinder 1 and the intake manifold M of the vehicle motor is discontinued, as when the accelerator actuating device 14 is depressed to permit of the passage of gaseous fuel from the charge forming device 21 into the intake manifold M. However, with release of the accelerator actuating device 14, the same will return to that position indicated in the Figure 2, whereupon the port 23 will align with the ports formed in the opposite sides of the casing 12 and will thus establish communication between the cylinder 1 and the intake manifold M, the resultant suction within the cylinder 1 serving to attract the piston 6 in a direction towards the end wall 2 of said cylinder and in consequence, impart a pull to the clutch actuating lever 9 in order that it will move the clutch to its disengaged or neutral position, hence, interrupting the transmission of motion to the driving wheels of the equipped vehicle. Thus, it will be understood that manual operation of the lever 9 is not needed since movement of the same inwardly to effect disengagement of the clutch will be automatically effected. However, when it is desired to again feed gaseous fuel to the intake manifold M of the vehicle motor, the accelerator device 14 is depressed, thereby disaligning the port 23 with the ports in the opposite side walls of the casing 12 and hence, interrupting communication as between the manifold M and the cylinder 1 but setting up communication as between such cylinder 1 and the atmosphere by way of the escapement valve 25, the enlarged portion 24 of the port 23 communicating with one of the ports in the casing 12 and the valve 25 and permitting of the passage of air through the valve into the tubing 7 and cylinder 1 in order that the piston 6 may return to its normal position adjacent the end wall 3. With such movement of the piston 6, the clutch actuating lever 9 will be returned to a position whereat it will permit of reengagement of the vehicle clutch and thus, establish connection between the vehicle motor and the driving wheels of the vehicle. Should it become necessary or desirable to manually operate the clutch actuating lever 9 irrespective of the invention, this may be readily effected by the interpositioning of the chain 10 between the piston rod 5 and the connecting link 11, such manual operation of the lever in no way interfering with the positioning of the piston 6 in its cylinder 1.

Manifestly, the construction shown is capable of considerable modification and such modification as is within the scope of our claims, we consider within the spirit of our invention.

We claim:

1. Valve means of the character described comprising a casing having oppositely disposed ports arranged in the same, an escapement valve mounted on and communicating with the interior of said casing, and an accelerator actuating device slidably received in said casing having a diametrically extending port therein, one side of which is enlarged and is adapted to establish communication between the oppositely disposed ports, and at other times being adapted to establish communication between one of said oppositely disposed ports and said escapement valve.

2. Valve means of the character described comprising a casing having oppositely disposed ports therein, an adjustable escapement valve mounted on and communicating with the interior of said casing, and an accelerator actuating device slidably received in said casing having ports therein communicable, at times, with the oppositely disposed ports of the casing and communicable, at other times, with one of said oppositely disposed ports and the adjustable escapement valve, as and for the purpose set forth.

3. Valve means of the character described comprising a casing having oppositely disposed ports formed in the intermediate portion thereof, an adjustable escapement valve mounted on and communicating with the interior of said casing, a valve snugly and slidably received for limited movement in the casing, said valve having a diametrically extending port therein, one side of which is enlarged and is adapted to establish communication between the oppositely disposed ports, at times, and at other times, to establish communication between one of said oppositely disposed ports and said escapement valve through the enlarged side of said diametrical port, and a connecting device slidably received in one end portion of said casing and yieldably connected to the adjacent end of said valve.

In witness whereof we have hereunto set our hands.

SAMUEL J. SIBLEY.
LEVI G. BUCKNER.